United States Patent
Akahane

(10) Patent No.: US 7,916,360 B2
(45) Date of Patent: Mar. 29, 2011

(54) IMAGE SCANNING APPARATUS

(75) Inventor: Hisayuki Akahane, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 337 days.

(21) Appl. No.: 12/184,381

(22) Filed: Aug. 1, 2008

(65) Prior Publication Data

US 2009/0034028 A1    Feb. 5, 2009

(30) Foreign Application Priority Data

Aug. 2, 2007    (JP) .................................. 2007-202132

(51) Int. Cl.
*H01N 1/04*    (2006.01)
(52) U.S. Cl. ......... 358/497; 358/474; 358/494; 358/471
(58) Field of Classification Search .................. 358/497, 358/494, 474, 471; 399/211; 474/109, 100, 474/101, 112, 113, 27, 12, 70
See application file for complete search history.

(56) References Cited

U.S. PATENT DOCUMENTS

| | | | | |
|---|---|---|---|---|
| 5,186,689 | A * | 2/1993 | Yamamoto et al. | 474/112 |
| 6,853,826 | B2 * | 2/2005 | Takahashi et al. | 399/211 |
| 7,623,813 | B2 * | 11/2009 | Takahashi et al. | 399/211 |
| 2009/0028597 | A1 * | 1/2009 | Takigawa et al. | 399/90 |

FOREIGN PATENT DOCUMENTS

JP    2000-037921    2/2000

* cited by examiner

*Primary Examiner* — Cheukfan Lee
(74) *Attorney, Agent, or Firm* — Workman Nydegger

(57) ABSTRACT

An image scanning apparatus includes an endless belt; a pair of rotating bodies being adapted to wind the belt therearound with tension and rotating for rotating the belt; an image scanning unit which moves in association with the rotation of the belt in a state of being fixed to the belt for scanning an image from a document; a pair of frame members connected to each other; a supporting shaft integrated with one of the frame members for rotatably supporting one of the rotating bodies; and a restraining member provided on the other frame member for restraining inclination of the supporting shaft caused by a shaft load applied to the supporting shaft by the belt being wounded around the pair of rotating members with tension.

5 Claims, 9 Drawing Sheets

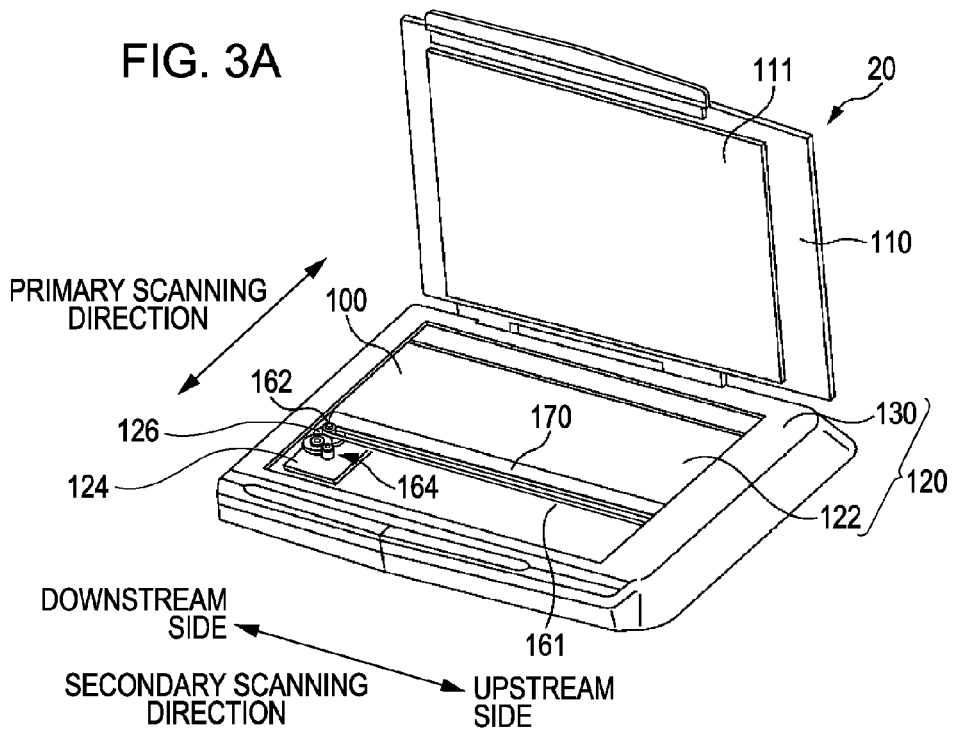
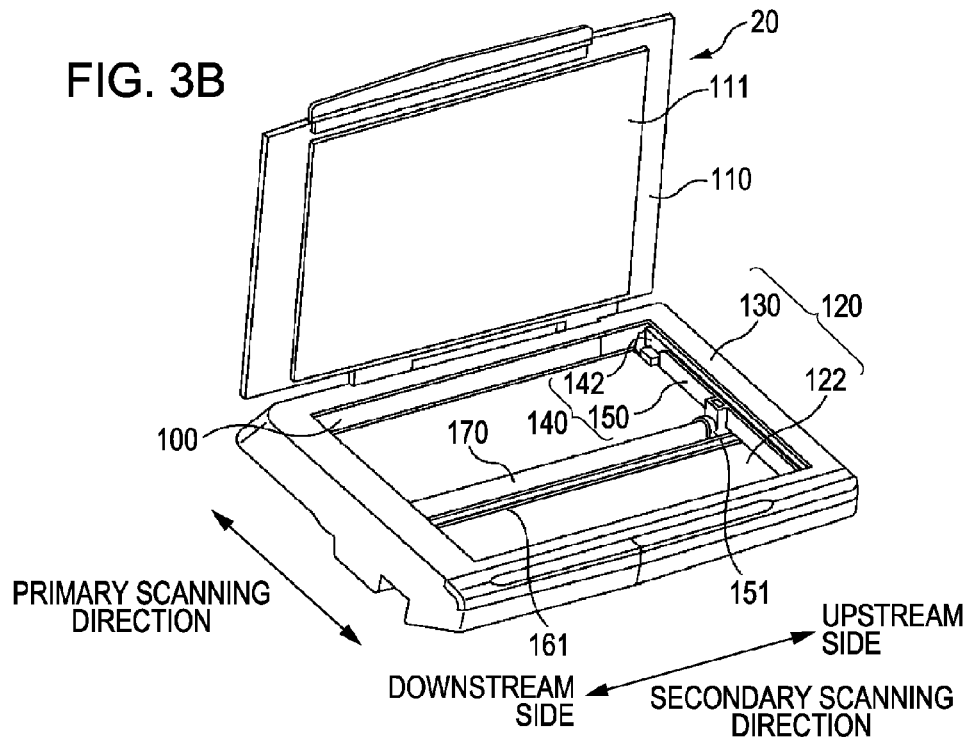

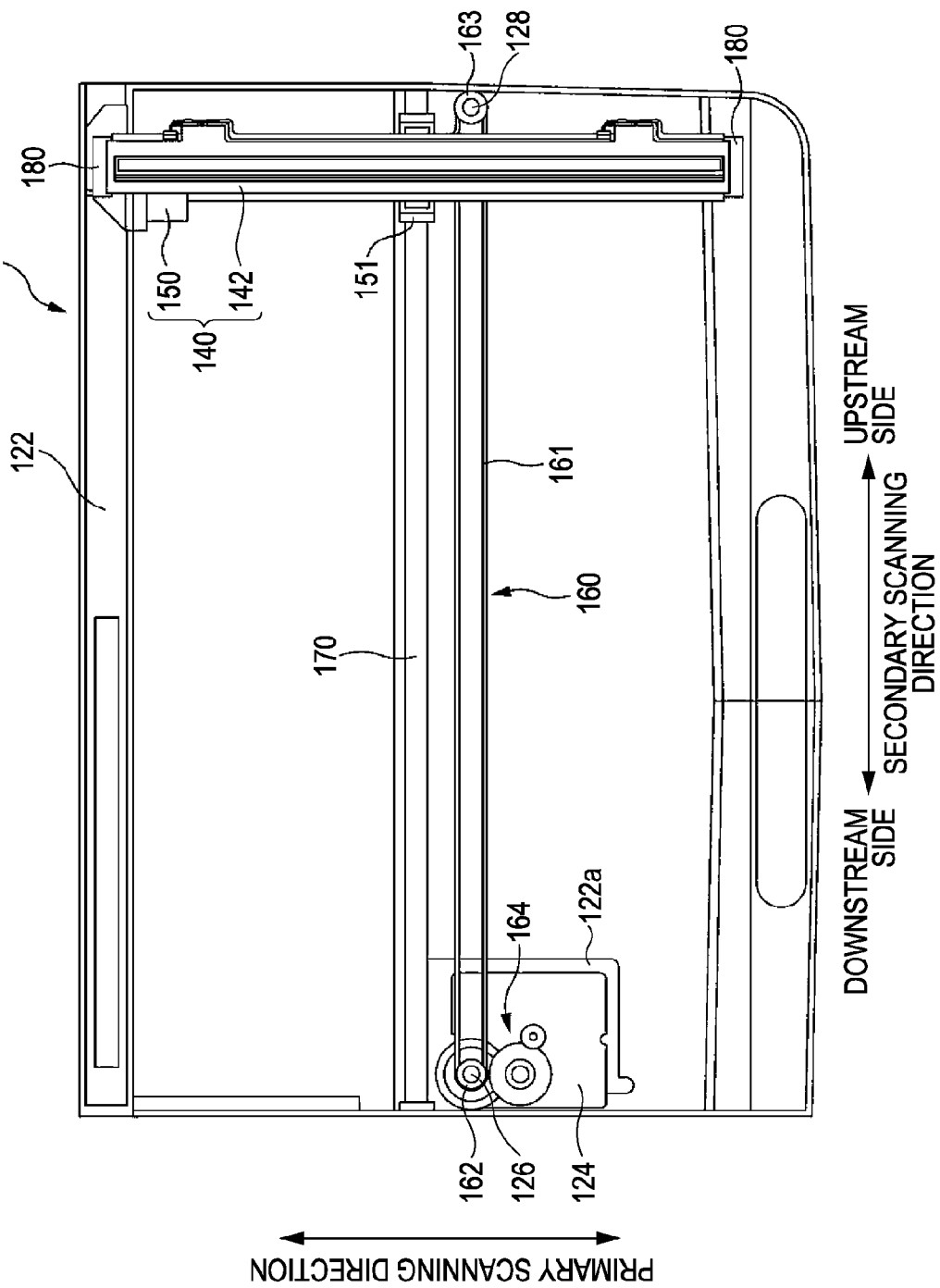

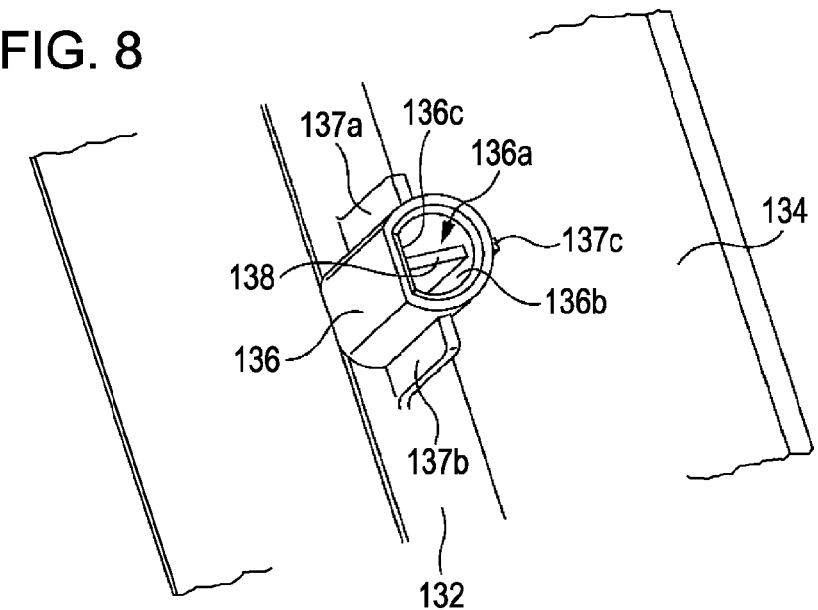
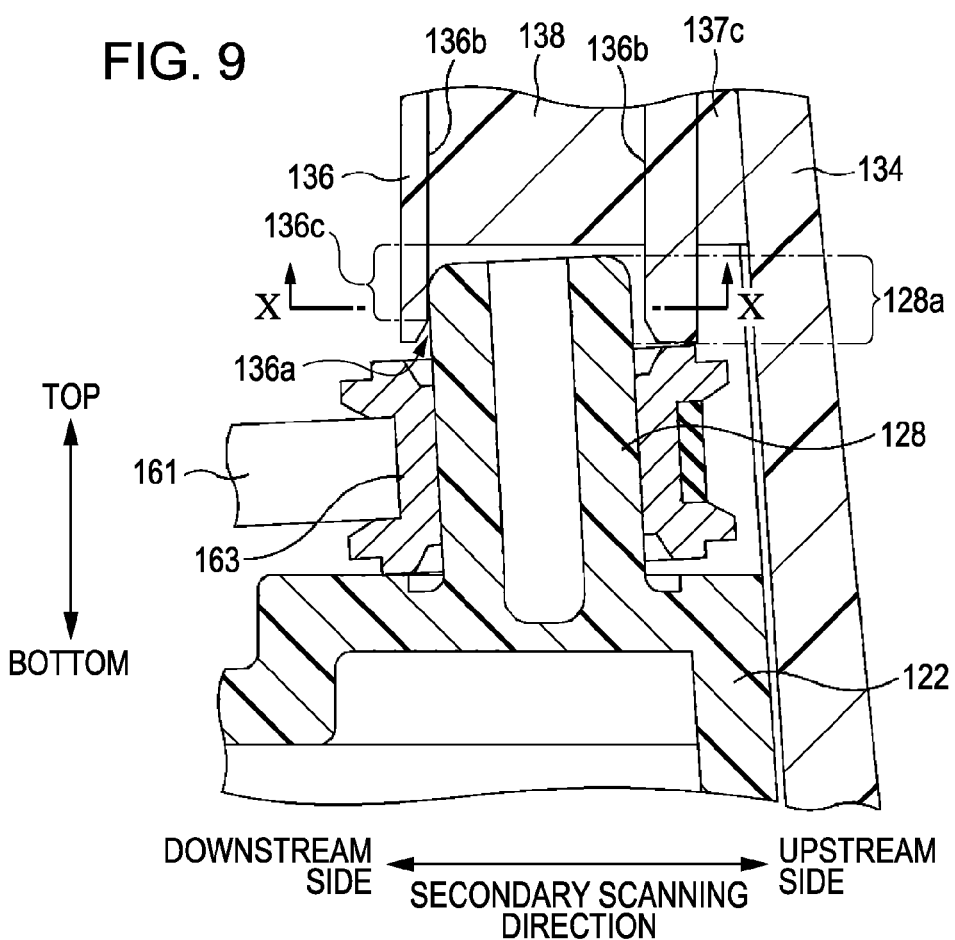

IMAGE SCANNING APPARATUS

BACKGROUND

1. Technical Field

The present invention relates to an image scanning apparatus.

2. Related Art

An image scanning apparatus including an endless belt, a pair of rotating bodies being adapted to wind the belt therearound with tension and rotating for rotating the belt, an image scanning unit for scanning image from a document, and a pair of frame members connected to each other is already known (see JP-A-2000-37921). The pair of rotating bodies are supported so as to be capable of rotating independently.

An attempt is made to simplify the image scanning apparatus for reducing the cost of the same. As a measure for simplifying the image scanning apparatus, for example, integrating a supporting shaft for supporting one of the rotating bodies with one of the frame members to reduce the number of components of the image scanning apparatus is considered.

However, integration of the supporting shaft with the one of the frame member fixes the position of the supporting shaft, and hence the supporting shaft has a tendency to incline due to a shaft load exerted on the supporting shaft by the belt wound around the pair of rotating bodies with tension. In addition, when the shaft load is continuously exerted on the supporting shaft, the extent of inclination of the supporting shaft is increased due to so-called creep. When the extent of inclination is remarkably increased, the image scanning apparatus will suffer from difficulty in scanning the image adequately.

SUMMARY

An advantage of some aspects of the invention is that one of a pair of rotating bodies wound by a belt therearound with tension is caused to be adequately supported by a supporting shaft which is integrated with a frame member.

A first aspect of the invention is an image scanning apparatus including an endless belt; a pair of rotating bodies being adapted to wind the belt therearound with tension and rotating for rotating the belt; an image scanning unit which moves in association with the rotation of the belt in a state of being fixed to the belt for scanning an image from a document; a pair of frame members connected to each other; a supporting shaft integrated with one of the frame members for rotatably supporting one of the rotating bodies; and a restraining member provided on the other frame member for restraining inclination of the supporting shaft caused by a shaft load applied to the supporting shaft by the belt being wound around the pair of rotating members with tension.

Other characteristics of the invention will be apparent from description in this specification and attached drawings.

The description in this specification and the attached drawings will bring out the following.

First of all, the invention provides the image scanning apparatus including the endless belt; the pair of rotating bodies having the belt wound therearound with tension and rotating for rotating the belt; the image scanning unit which moves in association with the rotation of the belt in a state of being fixed to the belt for scanning an image from a document; the pair of frame member connected to each other; the supporting shaft integrated with one of the frame members for rotatably supporting one of the rotating bodies; the restraining member provided on the other frame member for restraining inclination of the supporting shaft caused by a shaft load applied to the supporting shaft by the belt being wound around the pair of rotating members with tension.

In this arrangement, since increase in extent of inclination of the supporting shaft caused by the creep is restrained by the restraining member, the supporting shaft is prevented from significantly inclining. In other words, even with the supporting shaft which has a tendency to incline by being integrated with the one of the frame member, one of the rotating bodies wound by the belt therearound with tension is adequately supported.

Preferably, the restraining member is a projecting bearing unit for receiving the supporting shaft including a fitting hole for fitting a distal end portion of the supporting shaft and being integrated with the frame member. In this arrangement, since the number of components of the image scanning apparatus is smaller than the configuration in which the restraining member is separately provided, the image scanning apparatus is further simplified.

Preferably, the bearing unit includes a plane contact surface provided on an inner peripheral surface which surrounds the fitting hole for allowing the distal end portion to come into contact with, and the inclination is restrained by brining the contact surface into contact with the distal end portion in such a manner that the direction of contact for bringing the contact surface into contact with the distal end portion and the direction of the shaft load exerted on the supporting shaft are directed in the opposite direction.

Preferably, the one frame member includes a bottom frame and a side frame extending upright at one end in the direction along the direction of contact of the bottom frame, and the bearing unit includes a rib projecting from the bottom frame and extending from an outer peripheral surface of the bearing unit along the direction of contact so as to be in contact with the bottom frame and the side frame. In this arrangement, the strength of the bearing unit against the load exerted on the bearing unit when the contact surface is brought into contact with the distal end portion is improved.

Preferably, the bearing unit includes a rib extending from the inner peripheral surface on the side of the contact surface to a portion thereof on the opposite side from the contact surface in terms of the direction of contact. In this configuration, the strength of the bearing unit against the load exerted on the bearing unit when the contact surface is brought into contact with the distal end portion is improved.

Preferably, the pair of rotating bodies are a pair of pulleys, and the supporting shaft rotatably supports one of the pair of pulleys, and the bearing unit prevents the pulley from coming apart from the supporting shaft. In this configuration, the number of components of the image scanning apparatus is smaller in comparison with the configuration in which a restraining member for preventing the pulley from coming apart is separately provided, so that the image scanning apparatus is further simplified.

BRIEF DESCRIPTION OF THE DRAWINGS

The invention will be described with reference to the accompanying drawings, wherein like numbers reference like elements.

FIG. 3A is a perspective view showing the scanner unit 20 in a state in which an upper lid 110 is opened.

FIG. 3B is a perspective view showing the scanner unit 20 in a state in which an upper lid 110 is opened.

FIG. 4 illustrates an internal structure of the scanner unit 20.

FIG. 8 is a perspective view of the bearing unit 136.

FIG. 9 is a drawing showing a state in which a distal end portion 128a of a driven pulley supporting shaft 128 is engaged with a fitting hole 136a of the bearing unit 136.

DESCRIPTION OF EXEMPLARY EMBODIMENTS

Figure 1:
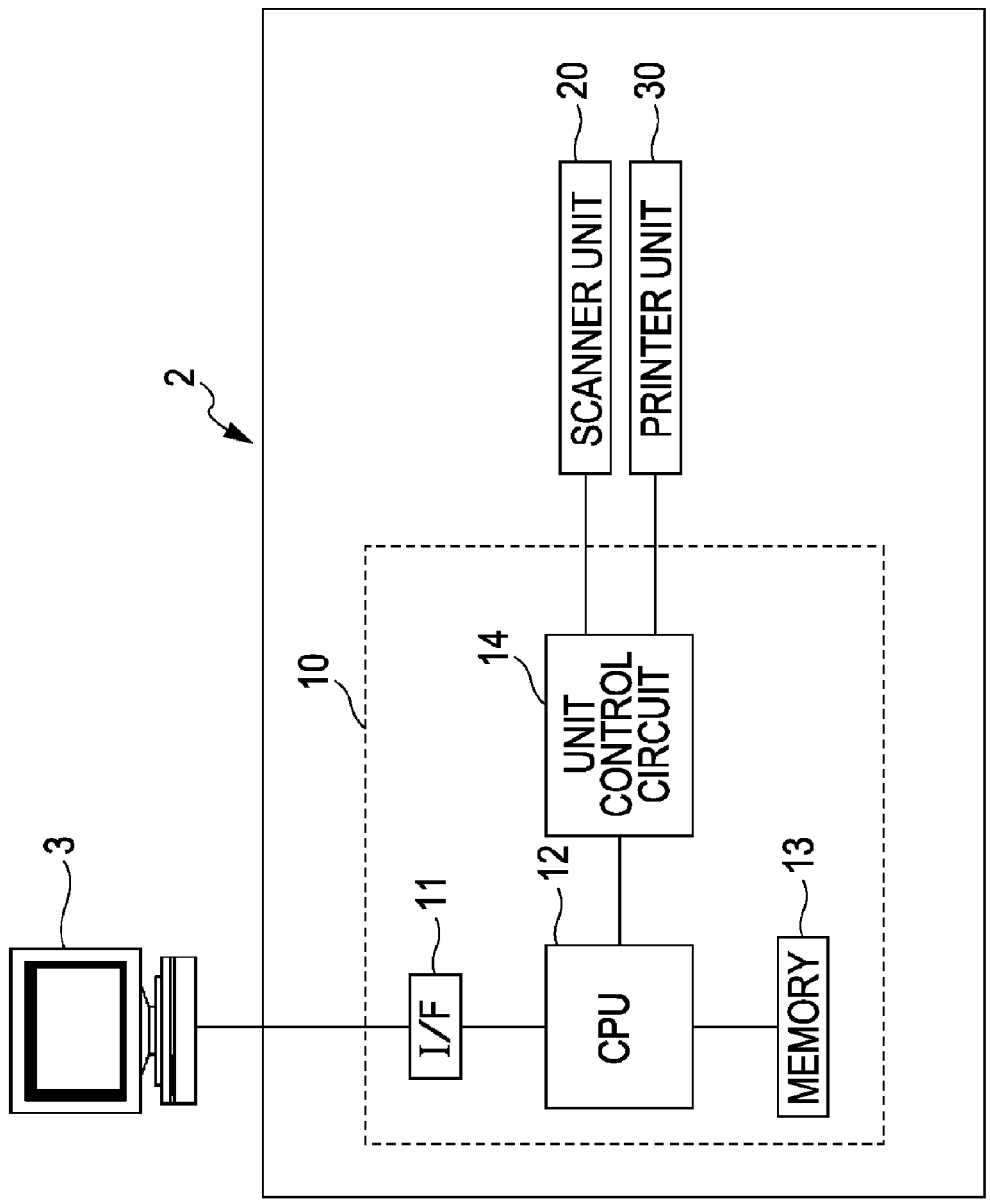
FIG. 1 is a block diagram of a multifunction apparatus 2.

Referring now to FIG. 1, a multifunction apparatus 2 as an example of an image scanning apparatus will be described. FIG. 1 is a block diagram of the multifunction apparatus 2.

The multifunction apparatus 2 has a scanner function for scanning an image from a document; a printer function for printing the image on a printing sheet on the basis of a print data from an external computer 3, and a copying function for printing the image scanned from the document on the printing sheet.

The multifunction apparatus 2 includes a controller 10, a scanner unit 20 and a printer unit 30 as shown in FIG. 1. The controller 10 controls the multifunction apparatus 2, and includes an interface 11 (indicated as I/F in FIG. 1), a CPU 12, a memory 13 and a unit control circuit 14. The CPU 12 controls the respective units (that is, the scanner unit 20 and the printer unit 30) by the unit control circuit 14 according to programs stored in the memory 13.

The scanner unit 20 includes a glass bed 100 for placing the document (for example, see FIG. 3A), scans the image of the entire area of the document placed on the glass bed 100, and acquires data of the image (hereinafter, also referred simply to as "image data"). Then, the acquired image data is transmitted to the computer 3 via the controller 10. In this manner, the scanner function of the multifunction apparatus 2 is demonstrated by the scanner unit 20 scanning the image from the document and acquiring the image data. The configuration of the scanner unit 20 will be described later in detail.

The printer unit 30 prints an image on a printing sheet by repeating a transporting operation for transporting the printing sheet and a dot-forming operation for forming dots on the printing sheets by discharging ink from nozzles provided on a head (not shown) which moves above the printing sheet alternately. The printer function of the multifunction apparatus 2 is demonstrated by the printer unit 30 repeating the transporting operation and the dot-forming operation. The copying function of the multifunction apparatus 2 is demonstrated by the printer unit 30 forming the image on the printing sheet on the basis of the image data.

Basic Configuration of Scanner Unit

Figure 2:
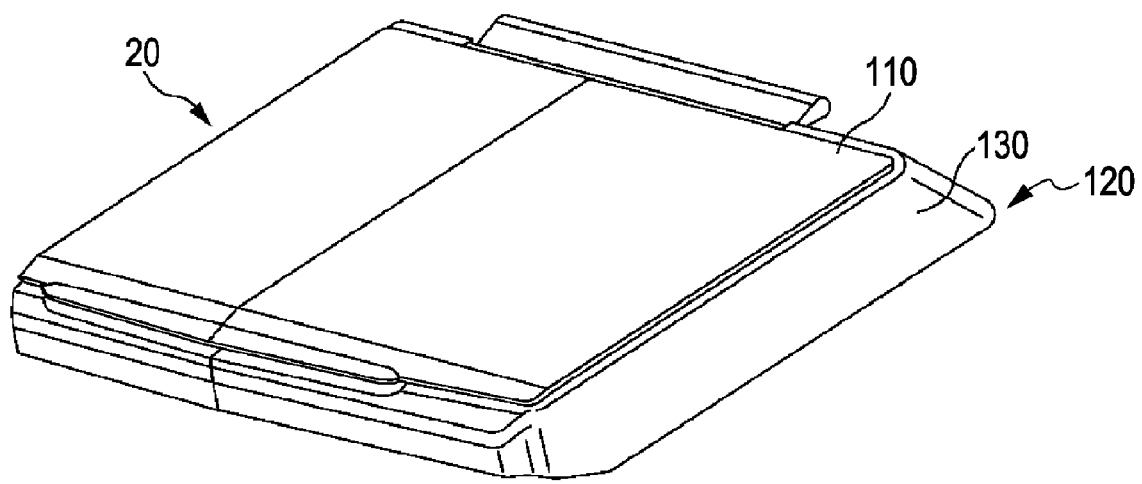
FIG. 2 is a perspective view of a scanner unit 20.
Figure 5:
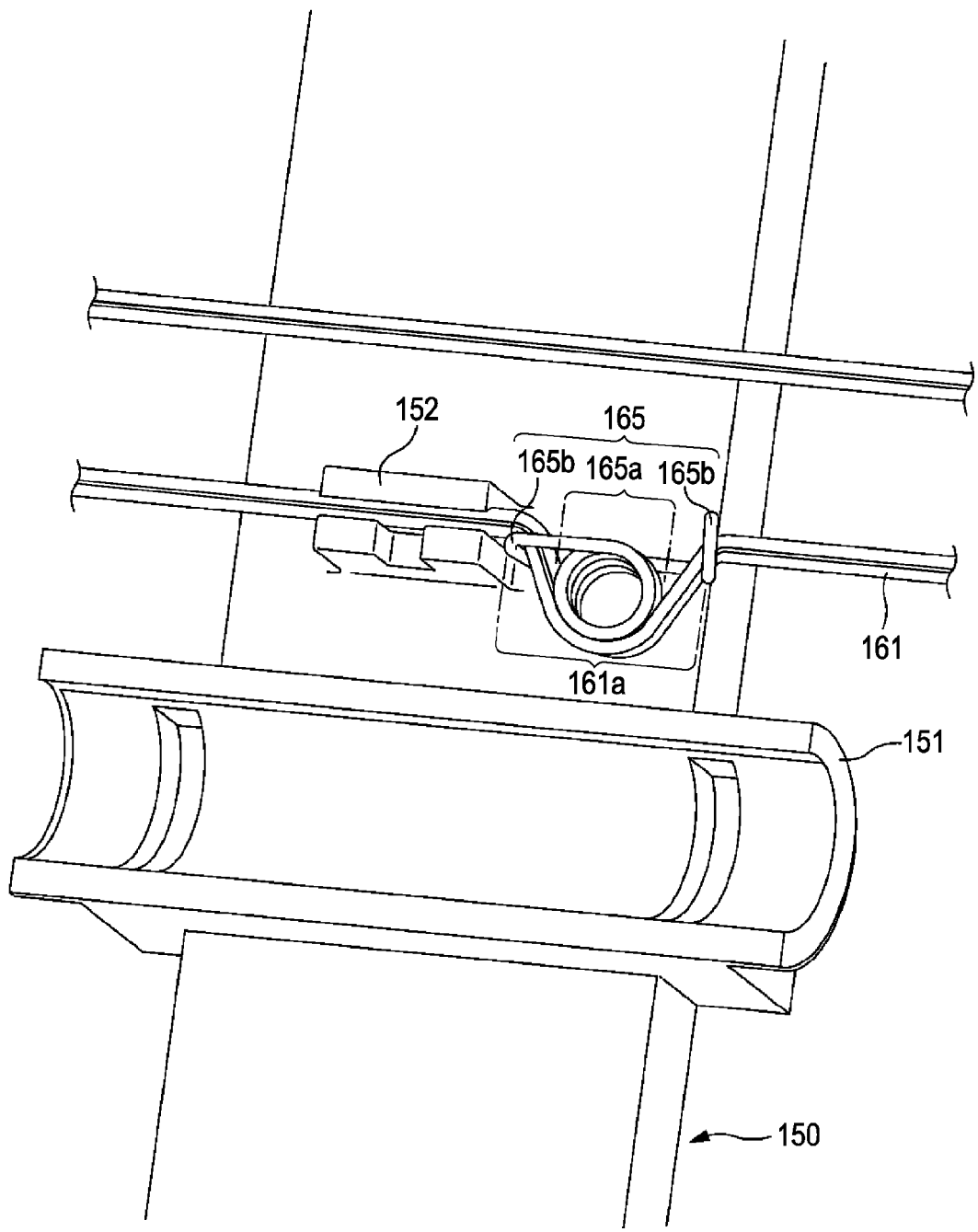
FIG. 5 is a drawing showing a coil spring 165 engaged with a timing belt 161.

Referring now to FIG. 2 to FIG. 5, a basic configuration of the scanner unit 20 will be described. FIG. 2 is a perspective view of the scanner unit 20. FIG. 3A and FIG. 3B are perspective views showing the scanner unit 20 in the state in which an upper lid 110 is opened. FIG. 3A and FIG. 3B indicates a primary scanning direction and a secondary scanning direction (the primary scanning direction and the secondary scanning direction will be described later) of the scanner unit 20 by arrows. FIG. 4 is a drawing showing an internal structure of the scanner unit 20 in a state in which the upper lid 110 and an upper case 130 are removed and viewed from above. FIG. 4 indicates the primary scanning direction and the secondary scanning direction by arrows. FIG. 5 is a back view of a carriage 150 fixed to a timing belt 161 showing a coil spring 165 engaged by the timing belt 161. In the following description, the side on which a driven pulley 163 is positioned is referred to as an upstream side and the side on which a drive pulley 162 is positioned is referred to as a downstream side in terms of the secondary scanning direction for the convenience of explanation.

The scanner unit 20 has an appearance shown in FIG. 2, and is mounted to an upper portion of the multifunction apparatus 2. As shown in FIG. 3A and FIG. 3B, the scanner unit 20 includes the openable and closable upper lid 110 and the substantially square-shaped glass bed 100. The upper lid 110 includes a white document mat 111. When the upper lid 110 is closed in a state in which the document is placed on the glass bed 100, the document is horizontally set between the document mat 111 and the glass bed 100.

As shown in FIG. 4, in the interior of the scanner unit 20, there are provided an image scanning unit 140 for scanning an image from the document while moving in the direction of movement and a drive mechanism 160 for moving the image scanning unit 140 in the direction of movement. The image scanning unit 140 and the drive mechanism 160 are stored in a casing 120 formed mainly of a resin material such as plastic. The casing 120 will be described later.

The image scanning unit 140 is positioned below the glass bed 100, irradiate the document placed on the glass bed 100 with light, detects reflected light and scans the image of the document. The image scanning unit 140 includes a contact image sensor of a contact optical system (hereinafter, referred to as CIS 142) and a carriage 150 which moves in the moving direction as shown in FIG. 4.

The CIS 142 includes a light source for irradiating the document, a lens for imaging reflected light reflected from the document and a plurality of CCD sensors for photo-electrically converting the formed image. The CIS 142 is mounted to the carriage 150 in a state in which the longitudinal direction thereof extends in the longitudinal direction of the carriage 150 and moves with the carriage 150. As shown in FIG. 4, spacers 180 which come into contact with the glass bed 100 are provided at both ends of the CIS 142 in terms of the longitudinal direction thereof for maintaining the distance between the glass bed 100 and the CIS 142. Photosensing elements of the plurality of CCD sensors are arranged in the longitudinal direction of the CIS 142, and the direction in which the photosensing elements are arranged (that is, the longitudinal direction of the image scanning unit 140) is referred to as "primary scanning direction".

The carriage 150 is supported by a guide bar 170 by the engagement between a engaging member 151 (see FIG. 5) provided on the bottom of the carriage 150 and curved into an arcuate shape with the column-shaped guide bar 170 (see FIG. 4). The carriage 150 is capable of sliding on the guide bar 170 in the direction of the axis of the guide bar 170. In other words, the axial direction of the guide bar 170 corresponds to the direction of movement of the image scanning unit 140. As shown in FIG. 4, the longitudinal direction (primary scanning direction) of the image scanning unit 140 and the axial direction of the guide bar 170 are substantially orthogonal to each other, and the image scanning unit 140 moves in the direction substantially orthogonal to the primary scanning direction. The direction of movement of the image scanning unit 140 (the axial direction of the guide bar 170) is referred to as "secondary scanning direction".

The drive mechanism 160 includes the timing belt 161, a pair of pulleys (that is, the drive pulley 162 and the driven pulley 163) for rotating the timing belt 161, a drive motor (not shown) for rotating the drive pulley 162, and a gear ring train 164 for transmitting a drive force of the drive motor to the drive pulley 162.

The timing belt 161 is a ring-shaped endless belt, and is wound around the pair of pulleys in a state of being exerted with tension. More specifically, as shown in FIG. 4, the drive pulley 162 is arranged at a downstream end of the secondary scanning direction and the driven pulley 163 is arranged at an upstream end thereof. Then, when the timing belt 161 is wound around the pair of pulleys, the timing belt 161 is exerted with tension, and extends in substantially parallel to the secondary scanning direction. In this embodiment, the coil spring 165 is engaged with the timing belt 161 for providing the tension to the timing belt 161. The coil spring 165 will be described referring to FIG. 5.

A portion of the coil spring 165 in the form of a cylinder (a cylindrical portion 165a shown in FIG. 5) is in contact with the peripheral surface of the timing belt 161, and a winding end 165b of the coil spring 165 is hooked on the timing belt 161. As shown in FIG. 5, the winding end 165b is bent along the widthwise direction of the timing belt 161, then is bent further along the direction of thickness of the timing belt 161 which intersects the widthwise direction, and is hooked on the timing belt 161. In the state as described above, the coil spring 165 is engaged with the timing belt 161. Accordingly, as shown in FIG. 5, a bent portion 161a bent into a substantially V-shape is formed at a portion of the timing belt 161 where the coil spring 165 is engaged.

When the timing belt 161 having the coil spring 165 engaged therewith is extended between the pair of pulleys, the bent portion 161a is expanded circumferentially of the timing belt 161, and the coli spring 165 is resiliently deformed (more strictly, the winding end 165b of the coil spring 165 is pulled circumferentially outward) correspondingly. When the coil spring 165 is resiliently deformed, both the circumferential ends of the bent portion 161a are pulled inward by the resiliency of the coil spring 165. Accordingly, the timing belt 161 is circumferentially urged by the coil spring 165, and a tension is exerted on the timing belt 161 by the coil spring 165.

As shown in FIG. 5, the timing belt 161 is nipped by a nipping member 152 provided on the bottom of the carriage 150. In other words, the image scanning unit 140 is fixed to the timing belt 161 by the nipping member 152. Therefore, when the timing belt 161 is rotated by the pair of pulleys, the timing belt 161 rotates with the image scanning unit 140 along the winding direction of the timing belt 161. That is, the image scanning unit 140 moves in the winding direction of the timing belt 161, that is, in the secondary scanning direction along with the rotation of the timing belt 161 in a state of being fixed to the timing belt 161. The coil spring 165 is engaged at a portion of the timing belt 161 positioned on the backside of the carriage 150 so as not to hinder the rotation of the timing belt 161 (see FIG. 5).

In the scanner unit 20 having a configuration as described thus far, the image scanning unit 140 carries out the scanning operation every time when the image scanning unit 140 is transported by an amount corresponding to one pixel in the secondary scanning direction by the rotation of the timing belt 161. In one scanning operation, the image data of a size corresponding to the width of the sheet of the document in the primary scanning direction and one pixel in the secondary scanning direction is acquired. Then, the image scanning unit 140 repeats the scanning operation while being transported by a predetermined distance in the secondary scanning direction to scan the image of the entire area of the document placed on the glass bed 100.

Casing

Figure 6:
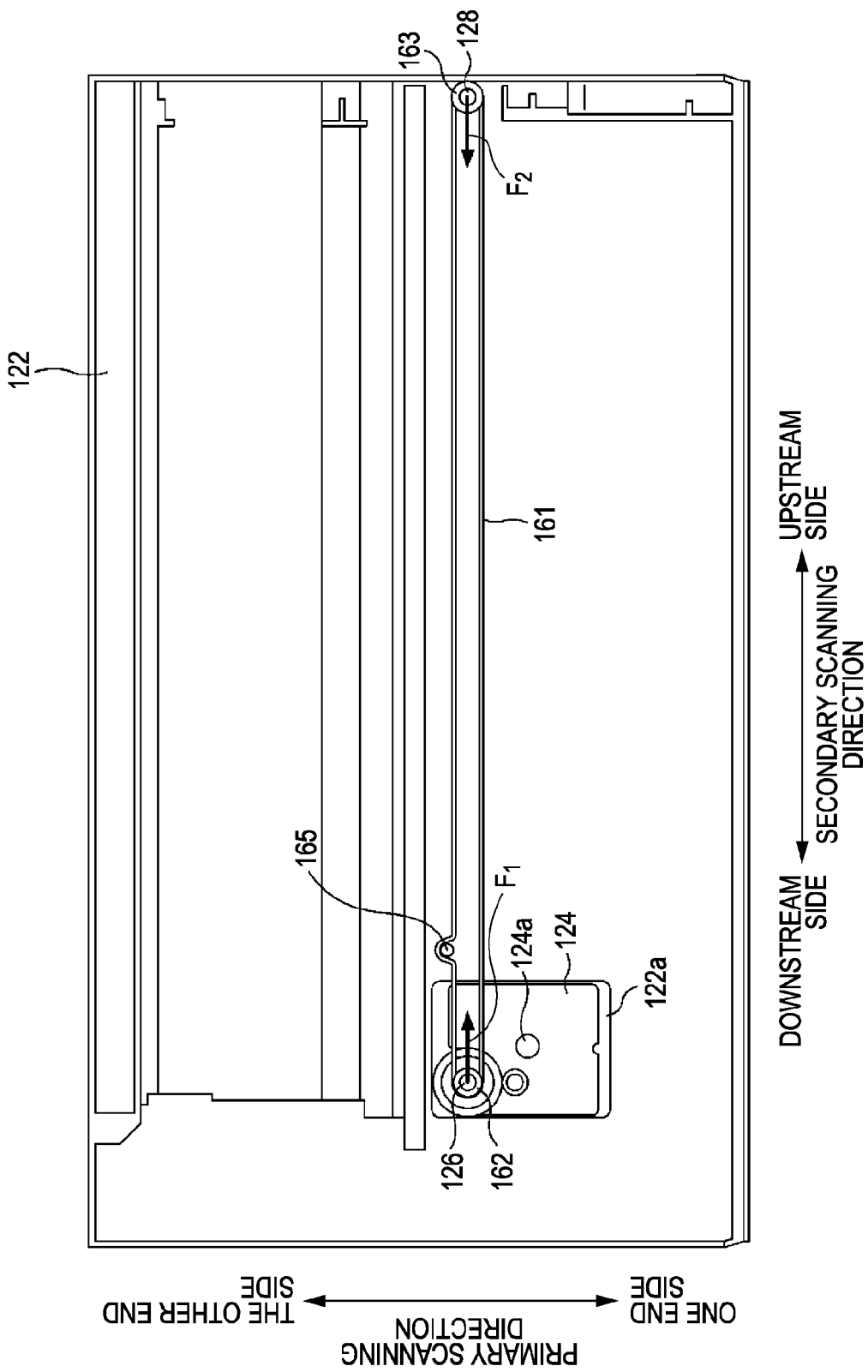
FIG. 6 is a schematic plan view of a lower case 122.
Figure 10:
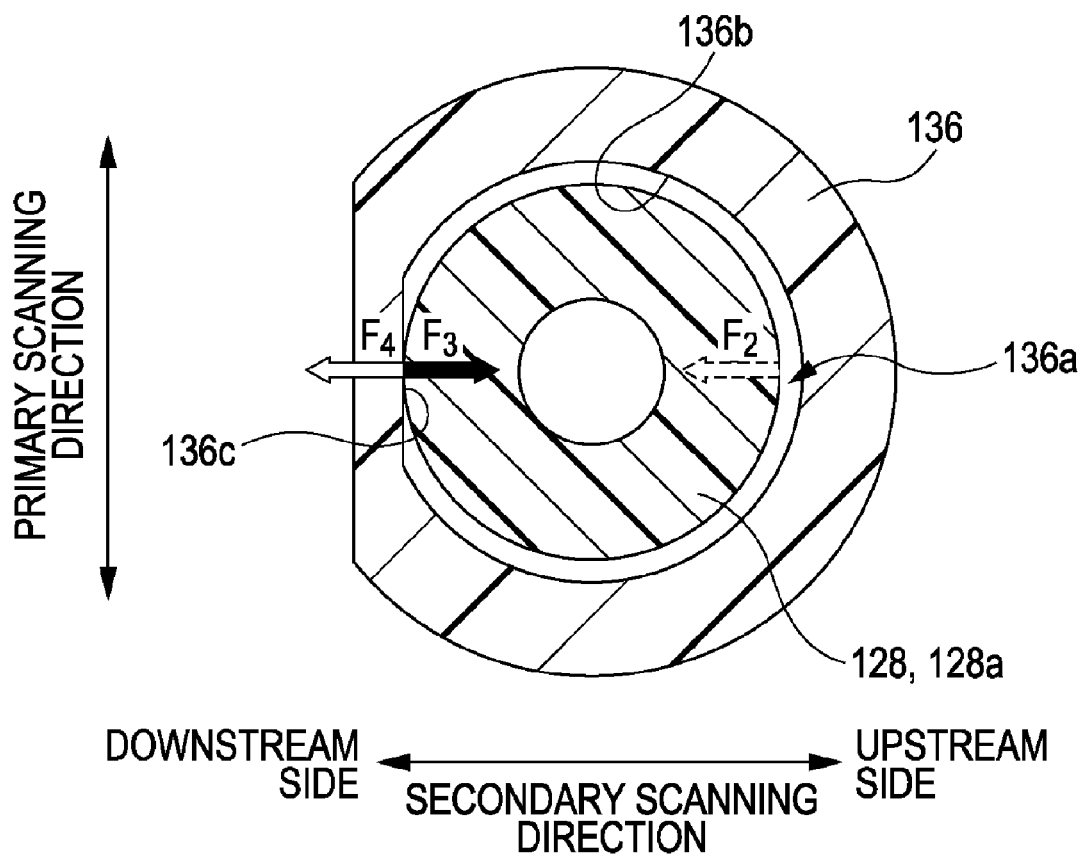
FIG. 10 is a drawing showing a cross-section taken along the line X-X in FIG. 9.

Referring now to FIG. 6 to FIG. 10, the casing 120 according to the present embodiment will be described. FIG. 6 is a schematic plan view showing a lower case 122 of the casing 120. FIG. 7A is a schematic plan view showing the upper case 130 of the casing 120 and FIG. 7B is an enlarged view of a bearing unit 136 provided on the upper case 130. FIG. 6 and FIGS. 7A and 7B illustrate inside the lower case 122 and the upper case 130, respectively, and the primary scanning direction and the secondary scanning direction are indicated by arrows in the drawings. For the sake of convenience, one end and the other end of the primary scanning direction are inverted between FIG. 6 and FIGS. 7A and 7B. FIG. 8 is a perspective view of the bearing unit 136. FIG. 9 is a drawing showing a state in which a distal end portion 128a of the driven pulley supporting shaft 128 engages the fitting hole 136a of the bearing unit 136. FIG. 9 shows a state in which the distal end portion 128a of a driven pulley supporting shaft 128 engages a fitting hole 136a of the bearing unit 136. FIG. 9 is a cross sectional view taken along the line XI-XI in FIG. 7B showing a state in which the distal end portion 128a is fitted to the fitting hole 136a, and the vertical direction and the secondary scanning direction are indicated by arrows in the drawing. FIG. 10 is a cross sectional view taken along the line X-X in FIG. 9, and the primary scanning direction and the secondary scanning direction are indicated by arrows in the drawing.

The casing 120 in this embodiment includes the upper case 130 and the lower case 122 as a pair of the frame members joined to each other. In other words, the casing 120 is formed by connecting the both cases in such a manner that the upper case 130 is covered on the lower case 122.

The lower case 122 which corresponds to one of the pair of frame members includes a depression 122a for storing the above-described drive motor formed on the downstream side of the bottom thereof in the secondary scanning direction as shown in FIG. 6. As shown in FIG. 6, a partition panel 124 formed of a metal plate for partitioning the inside and the outside of the depression 122a is provided at an opening of the depression 122a. The partition panel 124 is provided with a through hole 124a for allowing passage of the rotating shaft of the drive motor as shown in FIG. 6. The partition panel 124 includes a plurality of cylindrical projections projecting substantially in the vertical direction from the upper surface of the partition panel 124. As shown in FIG. 6, the respective projections rotatably support gears for transmitting a drive force of the drive motor or the above-described drive pulley 162 (in FIG. 6, some of gears are not shown for making description easy to understand). In other words, the plurality of projections includes a drive pulley supporting shaft 126 for supporting the drive pulley 162, and the drive pulley supporting shaft 126 is integrated with the partition panel 124. Members (not shown) for preventing the drive pulley 162 or the gears from coming apart from the respective projections are attached to distal ends of the respective projections.

The lower case 122 includes the driven pulley supporting shaft 128 provided on the bottom thereof so as to extend upright on the upstream side in the secondary scanning direction. The driven pulley supporting shaft 128 is a cylindrical projection and is a supporting shaft for rotatably supporting the driven pulley 163 which corresponds to one of the rotating bodies. The driven pulley supporting shaft 128 is integrated with the lower case 122, and is integrally molded with the lower case 122 when molding the lower case 122 with resin material.

The upper case 130 which corresponds to the other frame member includes a bottom frame 132 formed with an opening 132a and side frames 134 projecting at both ends of the bottom frame 132 in the secondary scanning direction.

Figure 7A:
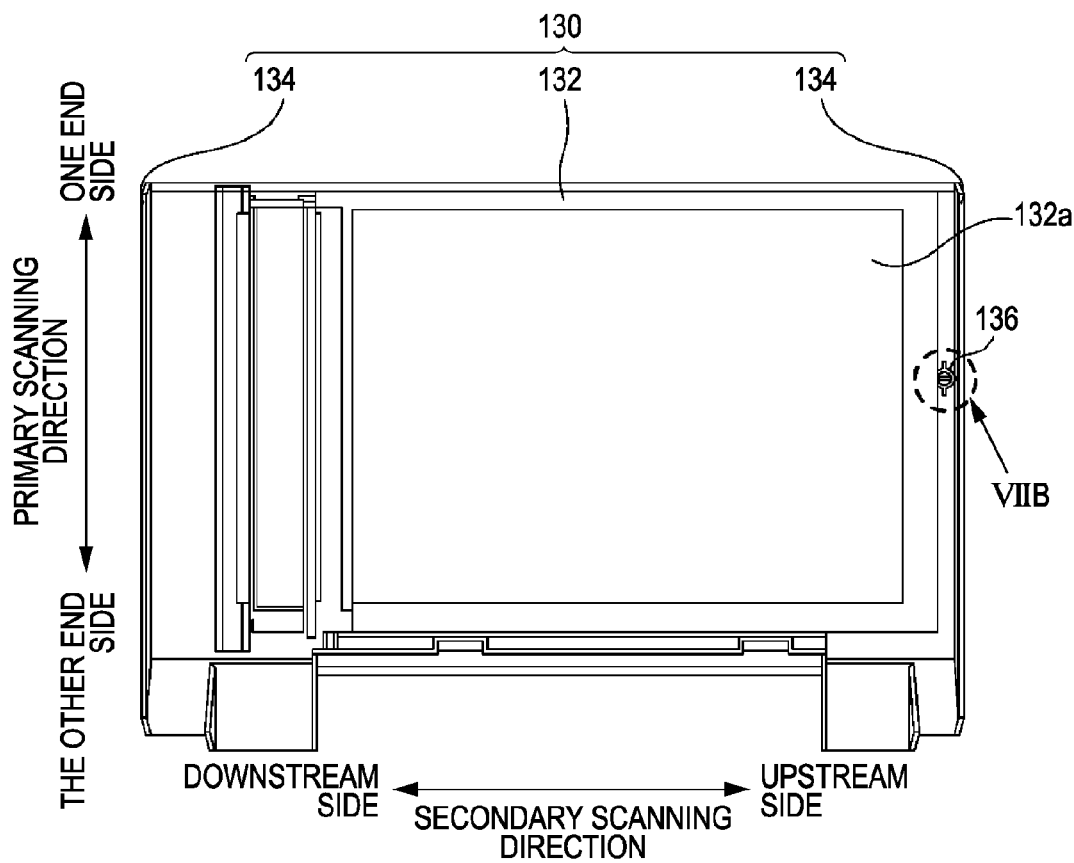
FIG. 7A is a schematic plan view of an upper case 130.

The above-described glass bed 100 is attached to the bottom frame 132 so as to close the opening 132a. As shown in FIG. 7A, the bearing unit 136 for receiving the driven pulley supporting shaft 128 is provided on the bottom frame 132 on the upper stream side in the secondary scanning direction. The bearing unit 136 is a substantially cylindrical-shaped projection projecting from the bottom frame 132. The bearing unit 136 in this embodiment is integrated with the upper case 130, and is integrally molded with the upper case 130 when molding the upper case 130 with resin material. As shown in FIG. 8, the substantially circular fitting hole 136a for fitting the distal end portion 128a (see FIG. 9) of the driven pulley supporting shaft 128 is provided on the bearing unit 136. When the upper case 130 and the lower case 122 are joined, the distal end portion 128a fits in the fitting hole 136a. As shown in FIG. 8 and FIG. 9, the opening of the fitting hole 136a is tapered, and hence the opening is wider than the inner side of the fitting hole 136a. Accordingly, when fitting the distal end portion 128a into the fitting hole 136a, the distal end portion 128a is easily introduced into the fitting hole 136a.

Fitting of the distal end portion 128a into the fitting hole 136a will be described in detail below.

The distal end portion 128a fits the fitting hole 136a in a state in which the pair of pulleys are supported by the respective supporting shaft and the timing belt 161 is wound between the pair of pulleys with tension. As shown in FIG. 9, the outer diameter of the bearing unit 136 is larger than the shaft diameter of the driven pulley supporting shaft 128. Therefore, when the distal end portion 128a fits the fitting hole 136a, the lower portion of the bearing unit 136 comes to a position surrounding the driven pulley supporting shaft 128 on the outside thereof. Accordingly, the bearing unit 136 restrains the driven pulley 163 from moving toward the distal end of the driven pulley supporting shaft 128. In other words, the bearing unit 136 in this embodiment functions as a restraining member for preventing the driven pulley 163 from coming off the driven pulley supporting shaft 128.

When the timing belt 161 exerted with a tension is wound around the pair of pulleys, a shaft load (shown in FIG. 6 with arrows F1 and F2) generated by the timing belt 161 being wound around the pair of pulleys with tension is applied to each of the supporting shafts which supports the pair of pulleys respectively (that is, the drive pulley supporting shaft 126 and the driven pulley supporting shaft 128). The load shaft acts inwardly of the winding direction of the timing belt 161 (that is, the direction substantially parallel to the secondary scanning direction). The driven pulley supporting shaft 128 from the supporting shafts which support the pair of pulleys is molded integrally with the lower case 122 with the resin material, and hence is lower in rigidity than the drive pulley supporting shaft 126. Therefore, when the shaft load F2 is exerted to the driven pulley supporting shaft 128, the driven pulley supporting shaft 128 is distorted so as to incline slightly toward the direction of exertion of the shaft load F2. When the upper case 130 and the lower case 122 are joined and hence the distal end portion 128a of the driven pulley supporting shaft 128 fits the fitting hole 136a of the bearing unit 136 in this state, the bearing unit 136 comes into contact with the distal end portion 128a in the fitting hole 136a.

Consequently, a phenomenon such that the extent of inclination of the driven pulley supporting shaft 128 increases by the shaft load F2 being continuously exerted on the driven pulley supporting shaft 128 (so-called, creep) is restrained. In this manner, the bearing unit 136 in this embodiment functions as a restraining member for restraining the inclination of the driven pulley supporting shaft 128 generated by the shaft load F2.

Referring now to FIG. 10, the function of the bearing unit 136 for restraining the inclination of the driven pulley supporting shaft 128 will be described in further detail.

When the distal end portion 128a of the driven pulley supporting shaft 128 fits into the fitting hole 136a, as shown in FIG. 9 and FIG. 10, the portion of an inner peripheral surface 136b surrounding the fitting hole 136a located on the downstream side in the secondary scanning direction comes into contact with the distal end portion 128a. In other words, this portion corresponds to a contact surface 136c provided on the inner peripheral surface 136b for being brought into contact with the distal end portion 128a. The contact surface 136c is positioned in front of the distal end portion 128a in the direction in which the shaft load F2 is applied (in other words, in the winding direction of the timing belt 161, that is, in the direction in substantially parallel with the secondary scanning direction) when the distal end portion 128a fits the fitting hole 136a.

In this embodiment, as shown in FIG. 10, the contact surface 136c is brought into contact with the distal end portion 128a in the direction from the downstream side toward the upstream side in the winding direction of the timing belt 161. On the other hand, the shaft load F2 is exerted from the upstream side toward the downstream side in the winding direction. In other words, in this embodiment, the contact surface 136c is brought into contact with the distal end portion 128a in such a manner that the direction to bring the contact surface 136c into contact with the distal end portion 128a and the direction in which the shaft load F2 is applied to the driven pulley supporting shaft 128 are opposed to each other. Accordingly, a contact force (shown by a sign F3 in FIG. 10) exerted from the contact surface 136c to the driven pulley supporting shaft 128 acts to cancel the shaft load F2. Then, inclination of the driven pulley supporting shaft 128 generated by the shaft load F2 is restrained by the contact force F3 and increase in extent of the inclination due to creep is also restrained.

Figure 7B:
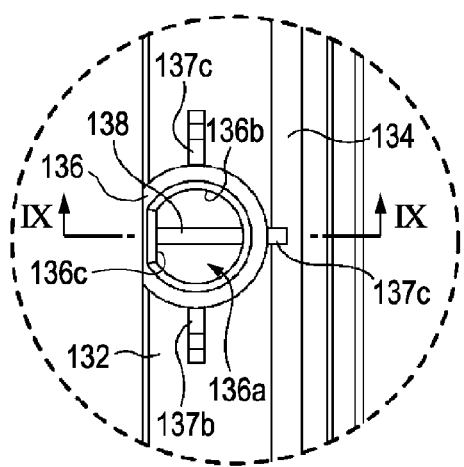
FIG. 7B is an enlarged view of a bearing unit 136 provided on the upper case 130.

As shown in FIG. 9, the contact surface 136c in this embodiment is provided on the lower side of the inner peripheral surface 136b (that is, the opening side of the contact surface 136a) in the direction of the center axis of the bearing unit 136. As shown in FIG. 7B and FIG. 8, the contact surface 136c is a plane surface, and the direction of its normal line is substantially parallel to the winding direction.

In other words, in this embodiment, in order to prevent distortion of the bearing unit 136 generated by the load applied to the bearing unit 136 when the contact surface 136c is brought into contact with the distal end portion 128a (that is, a reaction force against the contact force F3 indicated by a sign F4 in FIG. 10), a plurality of reinforcing ribs are provided on the bearing unit 136.

More specifically, as shown in FIGS. 7A and 7B and FIG. 8, three first ribs 137a, 137b and 137c extend from the outer peripheral surface of the bearing unit 136. The three first ribs 137a, 137b and 137c come into contact with the bottom frame 132. The two first ribs 137a and 137b from among the three first ribs 137a, 137b and 137c extend from the portions of the outer peripheral surface of the bearing unit 136 located on the opposite side from each other in the primary scanning direction in the main scanning direction. The other first rib 137c extends in the direction in the secondary scanning direction along the direction of contact, which is a direction to bring the contact surface 136c into contact with the distal end portion 128a. The first rib 137c extends from a portion of the outer peripheral surface of the bearing unit 136 positioned on the upstream side in the secondary scanning direction as shown in FIG. 7B and FIG. 8. Then, the first rib 137c is in contact with the bottom frame 132, and is also in contact with the side frame 134 provided upright at the end of the bottom frame 132 on the upstream side in the secondary scanning direction.

As shown in FIG. 7 to FIG. 9, a second rib 138 is provided in the fitting hole 136a. The second rib 138 is positioned in the fitting hole 136a on the inner side of the position where the contact surface 136c is located as shown in FIG. 8 and FIG. 9, and is provided from the portion of the inner peripheral surface 136b on the upstream side to the portion located on the downstream side in terms of the secondary scanning direction, that is, in the direction along the direction of contact. In other words, the second rib 138 is provided from the portion of the inner peripheral surface 136b located on the side of the contact surface 136c to the portion located on the opposite side from the contact surface 136c in terms of the secondary scanning direction.

Effectiveness of Multifunction Apparatus in this Embodiment

The multifunction apparatus 2 as the image scanning apparatus in this embodiment includes a timing belt 161; a pair of pulleys having the timing belt 161 wound therearound and rotating for rotating the belt; the image scanning unit 140 which moves along with the rotation of the timing belt 161 in a state of being fixed to the timing belt 161 for scanning an image from a document; an upper case 130 and a lower case 122 joined to each other; a driven pulley supporting shaft 128 integrated with the lower case 122 for rotatably supporting a driven pulley 163; and a bearing unit 136 provided on the upper case 130 for restraining inclination of the driven pulley supporting shaft 128 generated by the shaft load exerted on the driven pulley supporting shaft 128 by the timing belt 161 being wound around the pair of pulleys with tension. Accordingly, the driven pulley 163 of the pair of pulleys on which the timing belt 161 is wound around with tension is allowed to be supported adequately by the driven pulley supporting shaft 128 integrated with the lower case 122.

In other words, as described above, integrating the driven pulley supporting shaft 128 with the lower case 122 to reduce the number of components of the multifunction apparatus 2 is considered as a measure to simplify the multifunction apparatus 2 for reducing the cost of the multifunction apparatus 2. On the other hand, when the driven pulley supporting shaft 128 is integrated with the lower case 122, the position of the driven pulley supporting shaft 128 is fixed.

When the timing belt 161 is wound around the pair of pulleys in a state in which a tension is exerted on the timing belt 161, the shaft loads F1 and F2 are exerted on the supporting shafts which supports the respective pulleys (that is, the drive pulley supporting shaft 126 and the driven pulley supporting shaft 128). In this case, when the position of the driven pulley supporting shaft 128 is fixed by integrating the driven pulley supporting shaft 128 with the lower case 122, adjustment of the shaft loads F1 and F2 by adjusting the distance between the two supporting shaft becomes difficult. Therefore, a constant shaft loads F1 and F2 are continuously exerted on the supporting shaft which supports the pair of pulleys respectively while the timing belt 161 is wound around the pair of pulleys. The driven pulley supporting shaft 128 which is integrated with the lower case 122 has a tendency to incline in the direction in which the shaft load F2 is exerted (that is, the direction along the secondary scanning direction). In particular, as in this embodiment, since the driven pulley supporting shaft 128 formed integrally with the lower case 122 with resin material such as plastic is lower in rigidity than the drive pulley supporting shaft 126 formed of a metal plate, it has a tendency to incline more easily in the direction in which the shaft load F2 is applied.

When the constant shaft load F2 is exerted continuously on the driven pulley supporting shaft 128, the extent of inclination of the driven pulley supporting shaft 128 is increased by the creep, and when the inclination is increased to a remarkable extent, the driven pulley supporting shaft 128 cannot support the driven pulley 163 adequately without difficulty. In such a state, the driven pulley 163 cannot rotate the timing belt 161 adequately in cooperation with the drive pulley 162 without difficulty and hence the image scanning unit 140 can hardly be moved in the secondary scanning direction adequately. Consequently, the multifunction apparatus 2 is interfered with the image scanning process.

In contrast, in this embodiment, the bearing unit 136 as a restraining member for restraining the inclination of the driven pulley supporting shaft 128 is provided. As described above, when the distal end portion 128a of the driven pulley supporting shaft 128 is fitted into the fitting hole 136a of the bearing unit 136, the contact surface 136c provided on the inner peripheral surface 136b which surrounds the fitting hole 136a comes into contact with the distal end portion 128a in the direction opposite from the direction in which the shaft load F2 is exerted. In other words, the contact force F3 from the contact surface 136c is exerted on the driven pulley supporting shaft 128 in the direction opposite from the direction in which the shaft load F2 is exerted. Accordingly, the shaft load F2 is cancelled by the contact force F3, and hence restraint of increase in inclination of the driven pulley supporting shaft 128 due to the creep is achieved. Consequently, the driven pulley 163 is adequately supported stably even with the driven pulley supporting shaft 128 integrated with the lower case 122.

In this embodiment, since the member for restraining the inclination of the driven pulley supporting shaft 128 is the bearing unit 136 integrated with the upper case 130, the number of components of the multifunction apparatus 2 (more strictly, of the scanner unit 20) is smaller than the configuration in which the member for restraining the inclination is separately provided. Therefore, the multifunction apparatus 2 in this embodiment is further simplified, and hence has a further preferable configuration.

In this embodiment, the bearing unit 136 not only restrain the inclination of the driven pulley supporting shaft 128, but also prevent the driven pulley 163 from coming apart from the driven pulley supporting shaft 128. Accordingly, the number of components of the multifunction apparatus 2 is smaller than the configuration in which the restraining member for restraining the driven pulley from coming off the driven pulley supporting shaft 128 is separately provided. Therefore, the multifunction apparatus 2 in this embodiment is further simplified, and hence has a further preferable configuration.

In this embodiment, the plurality of reinforcing ribs are provided on the bearing unit 136 in order to prevent distortion of the bearing unit 136 caused by the load exerted on the bearing unit 136 when the contact surface 136c comes into contact with the distal end portion 128a of the driven pulley supporting shaft 128 (that is, reaction force F4).

More specifically, the bearing unit 136 includes the first ribs 137a, 137b and 137c extending form the outer peripheral surface thereof. The first ribs 137a, 137b and 137c come into contact with the bottom frame 132 of the upper case 130 to prevent the bearing unit 136 from inclining in the direction of exertion of the reaction force F4 by the reaction force F4. The first rib 137c from among the first ribs 137a, 137b and 137c extends in the direction along the direction of contact when bringing the contact surface 136c into contact with the distal end portion 128a of the driven pulley supporting shaft 128, and is in contact with the bottom frame 132 and the side frame 134 which extends upright at the end of the bottom frame 132 on the upstream side thereof in the secondary scanning direction. Therefore, the one first rib 137c is able to prevent the inclination of the bearing unit 136 caused by the reaction force F4 more efficiently than the other first ribs 137a and 137b.

The bearing unit 136 includes the second rib 138 in the fitting hole 136a. The second rib 138 is provided from the inner peripheral surface 136b positioned on the side of the contact surface 136c to the portion positioned on the side opposite from the contact surface 136c in the direction along the direction of contact. With the provision of the second rib 138, the portion of the bearing unit 136 which is located on the side of the contact surface 136c is adequately prevented from being pressed by the reaction force F4 in the direction in which the reaction force F4 acts and hence from being distorted thereby.

With the provision of the reinforcing ribs on the bearing unit 136, the strength of the bearing unit 136 with respect to the reaction force F4 is improved, and hence the multifunction apparatus 2 has a more preferable configuration.

Other Embodiments

The image scanning apparatus has mainly be described on the basis of the embodiment shown above. However, the above-described embodiment is simply for facilitating understanding of the invention, and is not intended to limit the invention. The invention may be modified and altered without departing the scope of the invention, and the equivalents are included in the invention as a matter of course.

In the embodiment shown above, the multifunction apparatus 2 has been exemplified as an example of the image scanning apparatus. In other words, in the embodiment shown above, the image scanning apparatus integrated with the printer unit 30 as a printing apparatus has been described. However, the invention is not limited thereto, and the image scanning apparatus may be a scanner which is not integrated with the printing apparatus.

What is claimed is:

1. An image scanning apparatus comprising:
an endless belt;
a pair of rotating bodies being adapted to wind the belt therearound with tension and rotating for rotating the belt;
an image scanning unit which moves in association with the rotation of the belt in a state of being fixed to the belt for scanning an image from a document;
a pair of frame members connected to each other;
a supporting shaft integrated with one of the frame members for rotatably supporting one of the rotating bodies; and
a restraining member provided on the other frame member for restraining inclination of the supporting shaft caused by a shaft load applied to the supporting shaft by the belt being wounded around the pair of rotating bodies with tension,
wherein the restraining member is a projecting bearing unit for receiving the supporting shaft including a fitting hole for fitting a distal end portion of the supporting shaft, where the restraining member is integrally formed with the frame member,
wherein a clearance between the supporting shaft and the projecting bearing unit in a shaft load direction is smaller than a clearance between the supporting shaft and the projecting bearing unit in all directions that intersect the shaft load direction, and
wherein a shaft load is applied to the supporting shaft in a shaft load direction when the shaft load is generated by the tension of the belt wound around the pair of rotating bodies.

2. The image scanning apparatus according to claim 1, wherein the bearing unit includes a plane contact surface provided on an inner peripheral surface which surrounds the fitting hole for allowing the distal end portion to come into contact with, and the inclination is restrained by brining the contact surface into contact with the distal end portion in such a manner that the direction of contact for bringing the contact surface into contact with the distal end portion and the direction of the shaft load exerted on the supporting shaft are directed in the opposite direction.

3. The image scanning apparatus according to claim 2, wherein the other frame member includes a bottom frame and a side frame extending upright at one end in the direction along the direction of contact of the bottom frame, and the bearing unit includes a rib projecting from the bottom frame and extending from an outer peripheral surface of the bearing unit along the direction of contact so as to be in contact with the bottom frame and the side frame.

4. The image scanning apparatus according to claim 2, wherein the bearing unit includes a rib extending from the inner peripheral surface on the side of the contact surface to a portion thereof on the opposite side from the contact surface in terms of the direction of contact.

5. The image scanning apparatus according to claim 1, wherein the pair of rotating bodies are a pair of pulleys, and the supporting shaft rotatably supports one of the pair of pulleys, and the bearing unit prevents the pulley from coming apart from the supporting shaft.

* * * * *